Figure 1:
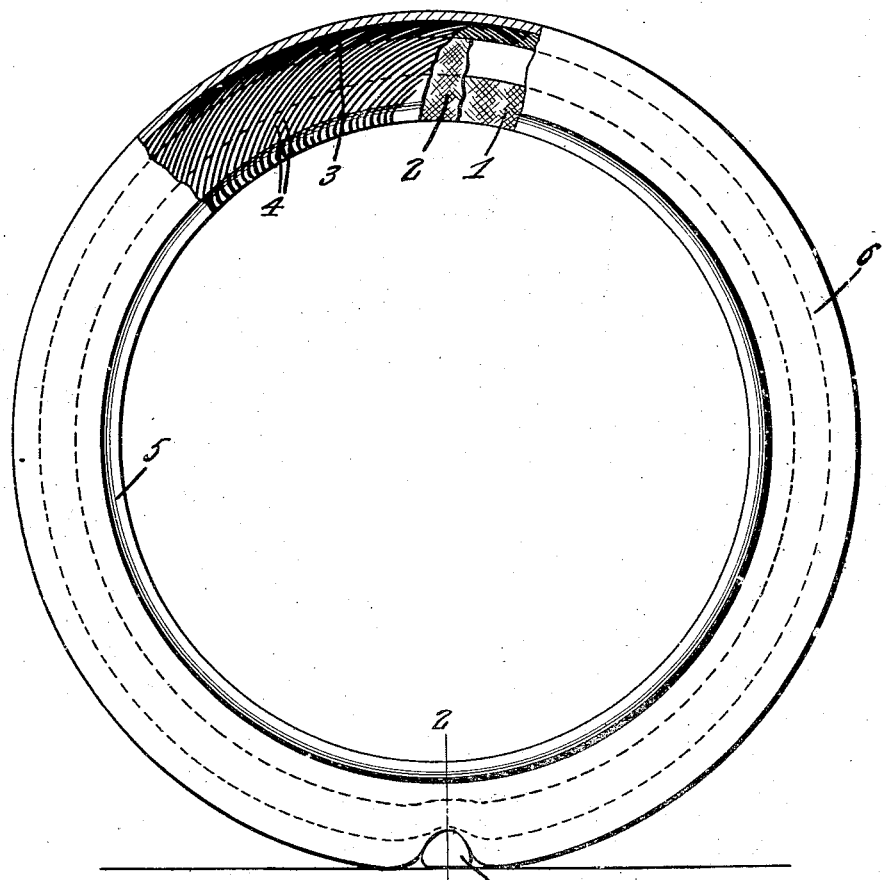

F. B. Pfeiffer, Inventor

Jan. 16, 1923.
F. B. PFEIFFER.
TIRE CASING.
FILED JUNE 10, 1921.
1,442,293.
2 SHEETS—SHEET 2.
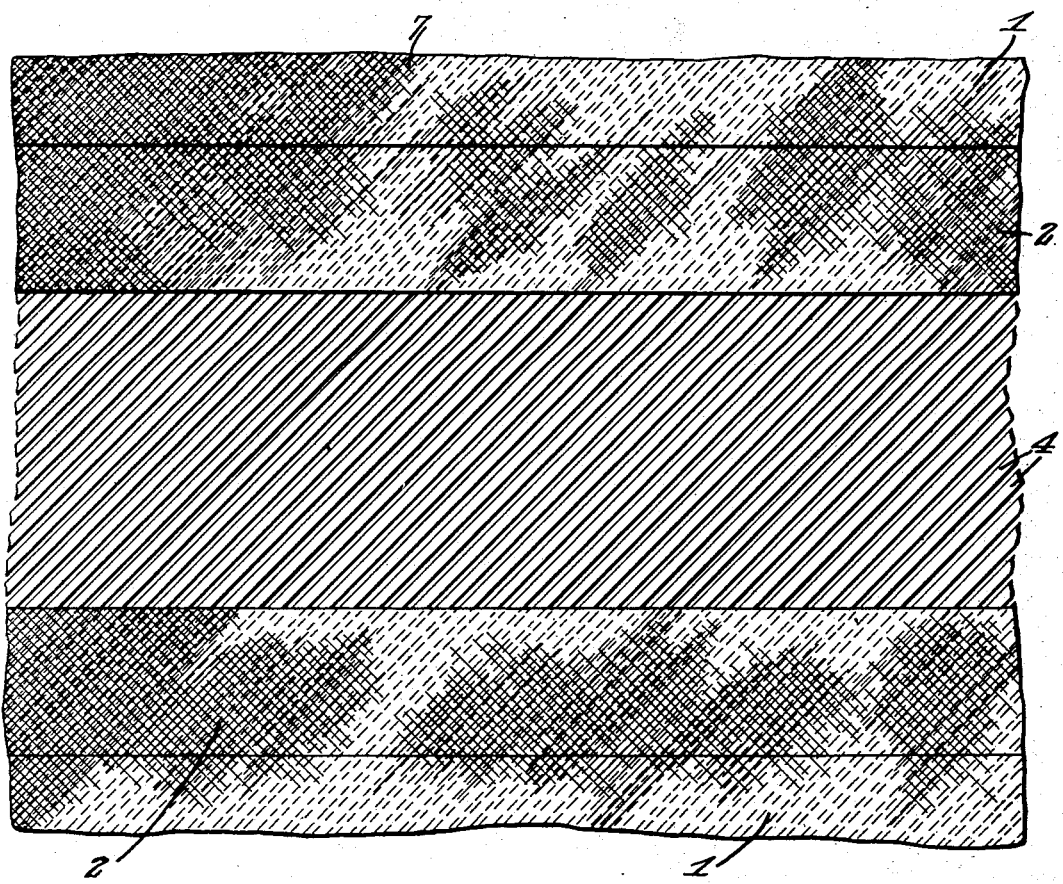
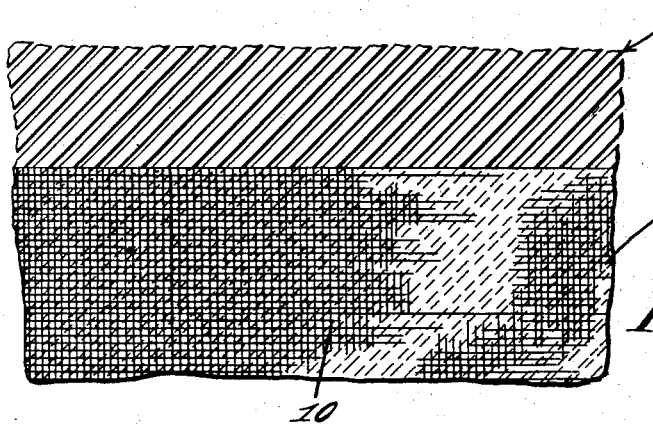
F. B. Pfeiffer,
Inventor
By C. A. Snow & Co.
Attorney Patented Jan. 16, 1923.

1,442,293

UNITED STATES PATENT OFFICE.

FRED B. PFEIFFER, OF AKRON, OHIO, ASSIGNOR TO THE STAR RUBBER COMPANY, INC., OF AKRON, OHIO.

TIRE CASING.

Application filed June 10, 1921. Serial No. 476,491.

*To all whom it may concern:*

Be it known that I, FRED B. PFEIFFER, a citizen of the United States, residing at Akron, in the county of Summit and State of Ohio, have invented a new and useful Tire Casing, of which the following is a specification.

By way of explanation it may be stated that when the constituent material of a tire casing is applied to the core, in the building of the casing, the material is stretched at the tread and is compressed at the sides of the casing adjacent to the beads. At a point between each bead and the tread there is a neutral line where the material is neither stretched nor compressed. From the neutral lines, across the tread, the casing is relatively unyielding, circumferentially of the casing and is relatively yielding from the neutral lines to the beads. Recalling that the tread is relatively unyielding, circumferentially of the casing, the result is that when the tread strikes an object, the tread does not enclose the object closely, or "cup" about it, but is distorted, circumferentially of the casing, for a distance much greater than the size of the object. As a consequence, the stress within the casing is increased and the pressure is transmitted entirely around the casing. If there is a weak spot in the casing, all of the stress is put upon that spot and there the casing blows out, even though the weak spot may be at considerable distance from the actual point of impact with the obstacle.

The foregoing being understood, it may be stated that the object of this invention, generally considered, is to provide a tire casing which is uniformly yieldable, circumferentially, in its tread portion, and properly reinforced at its sides adjacent to the beads, the construction being such that when an obstacle is encountered, the strain in the casing will be taken care of properly.

It is within the province of the disclosure to improve generally and to enhance the utility of devices of that type to which the invention appertains.

With the above and other objects in view, the invention consists in the novel construction and arrangement of parts hereinafter described, depicted in the drawings, and claimed, it being understood that within the scope of what is claimed, a mechanic may make such alterations as his skill may dictate, without departing from the spirit of the invention.

Figure 2:
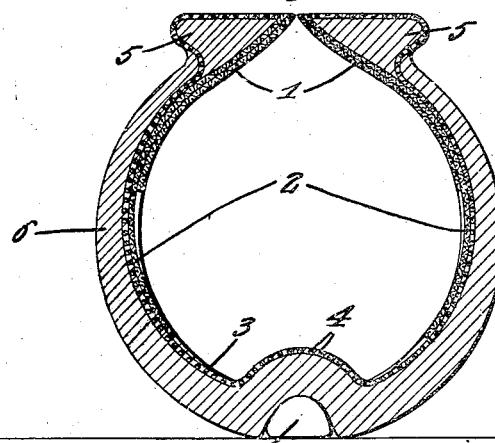

In the drawings: Figure 1 shows in side elevation, a device constructed in accordance with the invention, parts being broken away; Figure 2 is a cross section on the line 2—2 of Figure 1; Figure 3 is a plan, looking at the inside of the casing; Figure 4 is a plan looking at the inside of the casing in a modified form of the invention.

The casing includes inner circumferential strips 1, made of canvas or any other suitable material. Outer circumferential strips 2 are superposed on the strips 1 and extend beyond the strips 1, transversely of the casing, as shown in Figure 2. Beads 5 rest against the strips 2. A layer of cord fabric 3, or the equivalent thereof, is placed about the beads 5 and about the outer strips 2. The strands 4 of the cord fabric 3 preferably extend diagonally of the casing, as shown in the drawings. The layer 3 is enclosed within the body 6 of the casing, the body being of any standard construction and being made as desired. In Figure 3, the strips 1 and 2 have been shown as having been cut on the bias, so that the threads 7 thereof extend diagonally of the casing. In Figure 4, the cord fabric or its equivalent is denoted by the numeral 8, and one of the strips is shown at 9, the threads 10 of the strip extending circumferentially of the casing and transversely thereof.

When a casing constructed in accordance with the invention encounters an obstacle shown at 15, the casing encloses the obstacle closely, and there is no appreciable distortion of the casing, circumferentially, on either side of the obstacle. The stress in the casing is not transmitted to a remote weak point and not only are blow-outs and ruptures avoided, but, as well, the tire casing will ride smoothly over an obstacle, without appreciable shock or jar.

The operation of the cord fabric, which produces a circumferentially yieldable tread, may be explained simple illustration. Suppose that a single transverse cut is made in the inner surface of a tire casing of common construction. Then, when circumferential stretch occurs, the single cut opens until the stretch is neutralized. However, long before this condition obtains, the inner tube blows through the opening. If the circumferential stretch were twelve inches, a single cut would open to twelve inches before the stretch was neutralized, assuming that a twelve inch spread of the opening were a possibility. Assume, now, that twelve transverse cuts were made in the inner surface of the casing. Then, a twelve inch stretch would be distributed amongst the twelve cuts, and each cut would open an inch. Increase the cuts to twelve hundred, and each cut, under a twelve inch stretch, would open but one one-hundredth of an inch, under which circumstances, no one cut would open enough to admit the inner tube or to bring about a blowout. As the number of transverse cuts approaches infinity, the width of each cut approaches zero, and maximum circumferential flexibility in the tread is obtained, with a minimum possibility for blow-outs. This condition is closely approximated in the device forming the subject matter of this application.

The tire forming the subject matter of this application is tied or reinforced circumferentially at the sides, by the strips 1 and 2, and as a consequence, the casing will not yield transversely, or "wobble". The tread is worn uniformly throughout its width, and does not wear flat on either side of the median plane. The casing cups closely about obstacles and touches the ground entirely around the obstacle, as shown in Figures 1 and 2, the result being that the wheel is not lifted off the ground, with a consequent bounce or jar. Since the casing does not leave the ground when an obstacle is passed over, the tractive efficiency of the casing is not decreased. Owing to the fact that there is practically no rebound or jump, the casing may be made lighter than would be the case otherwise, economy of material resulting. Since the tread is uniformly yielding, an obstacle will enter or distort the casing locally, as distinguished from an extended circumferential distortion, and the impact will be lessened—an observation which will be understood readily when Figures 1 and 2 are noted.

In a casing as ordinarily constructed, the impact is greatest at the median plane of the tread, where most blows are received, whereas in the tire hereinbefore described, this portion of the casing is yieldable and relatively elastic. In a casing as commonly constructed, the material is compressed from the neutral lines to the beads and when the traction wave moves through the casing from the tread to the rim, an overheating and a straining of the casing results, the casing shown in this application being free from such undesirable consequences.

In Figure 3, the strands 4 are shown as spaced apart, in order that the operation of the device may be evident clearly. In practice, the strands of the cored fabric generally are in contact with each other, or substantially so, although the rubber may work into and between them, as is well understood by those skilled in the art.

I claim:—

1. A tire casing comprising a tread made up of transverse members which are so laid relatively to one another that each of them may move independently of the others at the median plane of the casing, to render the casing yieldable in its tread portion; and circumferential reinforcing elements engaged directly with the transverse members at their longitudinal edges, and extended far enough upon the side portions of the transverse members so that the reinforcing elements have marked effect in limiting side strain and lateral shear in the casing at points remote from the longitudinal edges of the casing, the reinforcing elements terminating short of the median plane of the casing, to permit the casing to yield circumferentially at its median plane.

2. A tire casing constructed as set forth in claim 1, and further characterized by the fact that each reinforcing element is engaged directly with the inner surface of the transverse members and embodies overlapped strips, one of which is wider than the other.

In testimony that I claim the foregoing as my own, I have hereto affixed my signature in the presence of two witnesses.

FRED B. PFEIFFER.

Witnesses:
 FULDA L. SEARCH,
 MASON B. LAWTON.